US009305166B2

(12) United States Patent
Kastner et al.

(10) Patent No.: US 9,305,166 B2
(45) Date of Patent: Apr. 5, 2016

(54) METHOD AND SYSTEMS FOR DETECTING AND ISOLATING HARDWARE TIMING CHANNELS

(71) Applicant: The Regents of the University of California, Oakland, CA (US)

(72) Inventors: Ryan Kastner, La Jolla, CA (US); Jason Oberg, La Jolla, CA (US); Sarah Meiklejohn, La Jolla, CA (US); Timothy Sherwood, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 30 days.

(21) Appl. No.: 14/201,230

(22) Filed: Mar. 7, 2014

(65) Prior Publication Data
US 2014/0259161 A1   Sep. 11, 2014

Related U.S. Application Data

(60) Provisional application No. 61/774,712, filed on Mar. 8, 2013.

(51) Int. Cl.
*G06F 21/55* (2013.01)
(52) U.S. Cl.
CPC .................... *G06F 21/556* (2013.01)
(58) Field of Classification Search
CPC ................................................ G06F 21/556
See application file for complete search history.

(56) References Cited

U.S. PATENT DOCUMENTS

| 5,870,309 | A * | 2/1999 | Lawman | G06F 17/5054 716/102 |
| 8,091,128 | B2 * | 1/2012 | Yu | G06F 21/556 726/1 |
| 8,381,192 | B1 * | 2/2013 | Drewry et al. | 717/128 |
| 2007/0107058 | A1 * | 5/2007 | Schuba et al. | 726/23 |
| 2013/0139262 | A1 * | 5/2013 | Glew | G06F 21/56 726/23 |
| 2015/0128262 | A1 * | 5/2015 | Glew | G06F 21/554 726/23 |

OTHER PUBLICATIONS

Aciiçmez, O., et al., "Trace-driven cache attacks on AES (short paper)", ICIS (2006), pp. 112-121.
Berstein, Daniel, J., "Cache-timing attacks on AES", Technical Report (2005), 37 pages.
Crandall, Jedidiah R., et al., "Minos: Control Data Attack Prevention Orthogonal to Memory Model", MICRO 2004, (2004), pp. 221-232.
Dalton, Michael, et al., "Raksha: A Flexible Information Flow Architecture for Software Security", ISCA 2007, Jun. 9-13, 2007, pp. 482-493.

(Continued)

*Primary Examiner* — Saleh Najjar
*Assistant Examiner* — Louis Teng
(74) *Attorney, Agent, or Firm* — Greer, Burns & Crain, Ltd.

(57) ABSTRACT

A method for detecting a timing channel in a hardware design includes synthesizing the hardware design to gate level. Gate level information flow tracing is applied to the gate level of the hardware design via a simulation to search for tainted flows. If a tainted flow is found, a limited number of traces are selected. An input on the limited number of traces is simulated to determine whether the traces are value preserving with respect to taint inputs, and to determine that a timing flow exists if the traces are value preserving with respect to the taint inputs.

9 Claims, 8 Drawing Sheets

(56) References Cited

OTHER PUBLICATIONS

Gray, III, J. W., "ON introducing noise into the bus-contention channel", Proceedings of the 1993 IEEE Symposium on Security and Privacy, (1993), pp. 90-98.

Gullasch, David, et al., "Cache Games—Brining Access-Based Cache Attacks on AES to Practice", Proceedings of the 2011 IEEE Symposium of Security and Privacy, (2011), pp. 490-505.

Hu, M., et al., "Reducing timing channels with fuzzy time", Proceedings of the 1991 IEEE Symposium of Security and Privacy, (1991), pp. 8-20.

Kemmerer, Richard A., "Shared Resource Matrix Methodology: An Approach to Identifying Storage and Timing Channels", ACM Trans. Compt. Syst., (1983) pp. 256-277.

Krohn, Maxwell, et al., "Information Flow Control for Standard OS Abstractions", SOSP '07, Oct. 14-17, 2007, pp. 321-334.

Li, Xun et al., "Caisson: A Hardware Description Language for Secure Information Flow", PLDI'11, Jun. 4-8, 2011, pp. 109-120.

Oberg, Jason, et al., "Information Flow Isolation in I2C and USB", Proceedings of Design Automation Conference (DAC) 2011, Jun. 5-10, 2011, pp. 254-259.

Osvik, Dag Arne, et al., "Cache Attacks and Countermeasures: The Case of AES", Proceedings of The 2006 the Cryptogrophers' Track at the RSA conference on Topics in Cryptography, (2006), pp. 1-20.

Ristenpart, Thomas, et al., "Hey, You, Get Off of My Cloud: Exploring Information Leakage in Third-Party Compute Clouds", Proceedings of CCS 2009, Nov. 9-13, 2009, pp. 199-212.

Sabelfeld, Andrei, et al., "Language-Based Information-Flow Security", IEEE Journal on Selected Areas in Communications, vol. 21, No. 1, Jan. 2003, pp. 1-15.

Suh, G. Edward, et al., "Secure Program Execution via Dynamic Information Flow Tracking", ASPLOS'04, Oct. 7-13, 2004, pp. 85-96.

Tiwari, Mohit, et al., "Complete Information Flow Tracking from the Gates Up", ASPLOS'09, Mar. 7-11, 2009, 12 pages.

Tiwari, Mohit, et al., "Execution Leases: A Hardware-Supported Mechanism for Enforcing Strong Non-Interference" MICRO'09, Dec. 12-16, 2009, pp. 493-504.

Tiwari, Mohit, et al., "Crafting a Usable Microkernel, Processor, and I/O System with Strict and Provable Information Flow Security", Proceedings of ISCA 2011, Jun. 4-8, 2011, pp. 189-200.

Tolstrup, Terkel, K.,"Language-based Security for VHDL", PhD Thesis, Informatics and Mathematical Modelling, Technical University of Denmark, DTU, (2007), 158 page.

Wassel, Hassan, M.G., et al., "SurfNoC: A Low Latency and Provably Non-Interfering Approach to Secure Networks-On-Chip", ISCA'13, (2013), pp. 583-594.

Wray, John C., "An Analysis of Covert Timing Channels", Proceedings of the 1991 IEEE Symposium on Security and Privacy, (1991), pp. 8-20.

\* cited by examiner

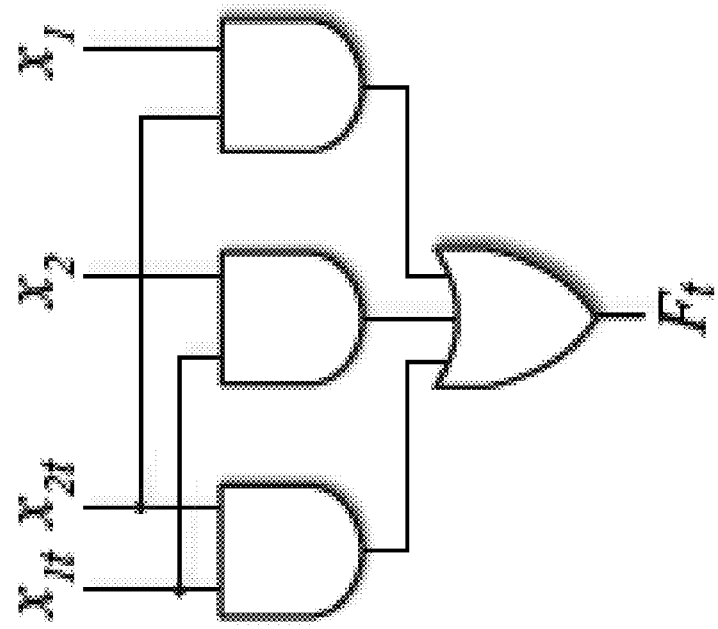
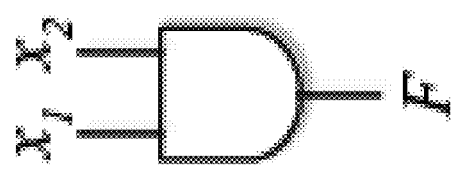
FIG. 1A
FIG. 1B
FIG. 1C

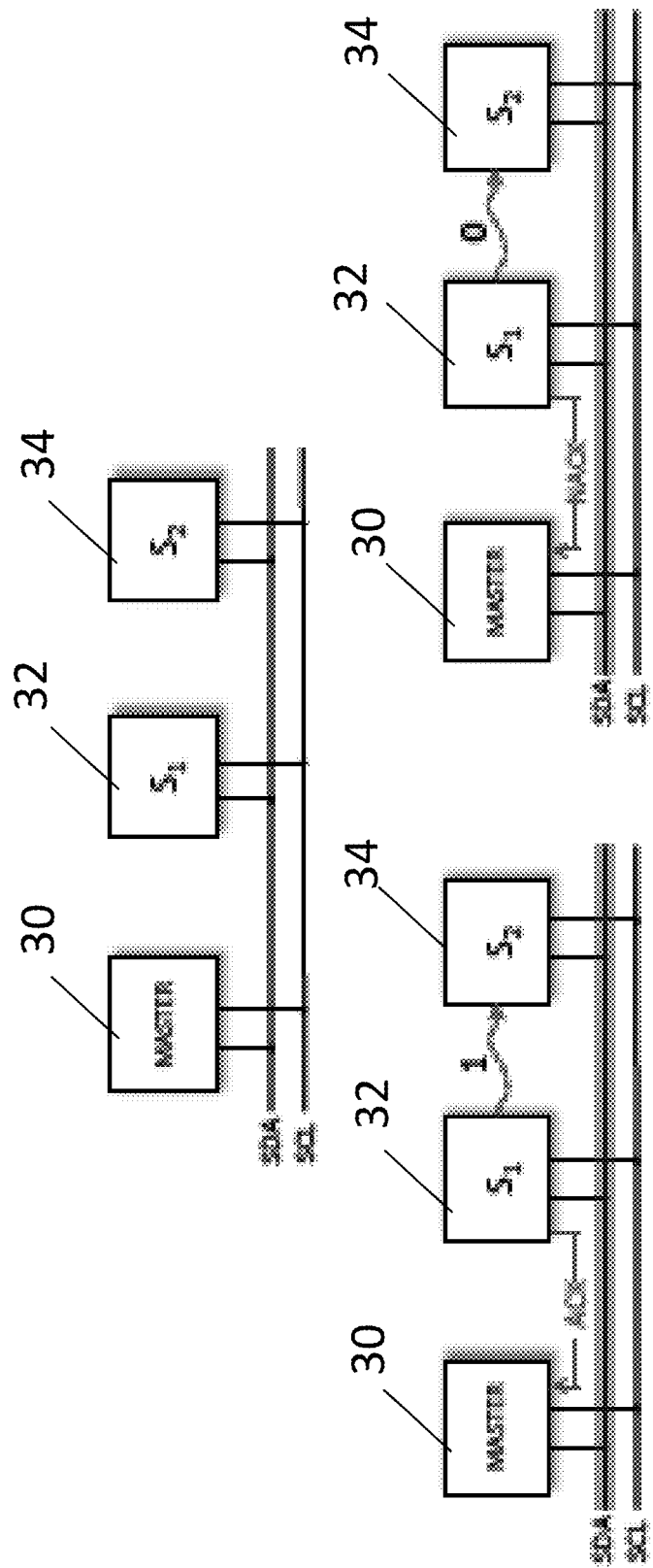

METHOD AND SYSTEMS FOR DETECTING AND ISOLATING HARDWARE TIMING CHANNELS

PRIORITY CLAIM AND REFERENCE TO RELATED APPLICATION

This application claims priority under 35 U.S.C. §119 from prior provisional application No. 61/774,712, filed Mar. 8, 2013, which is incorporated by reference herein.

FIELD

A field of the invention is data security. The invention concerns the detection, isolation and evaluation of hardware timing channels. The invention is widely applicable to digital devices and microprocessor based systems. A particular application is to the analysis of embedded computer systems to detect timing flows that compromise security or safety critical embedded systems.

BACKGROUND

Timing channels are a form of a so-called side channel. A side channel is created by a circuit element that leaks information unintentionally. Side channels can be exploited by adversaries to extract secret information or compromise the correct operation of high integrity components. For example, a side channel can be used to extract a secret encryption key or to affect the time in which a braking system in a car responds to the press of the brake pedal.

Modern embedded computing systems, e.g., medical devices, airplanes, and automobiles, increasingly rely upon embedded computing systems. Such systems often include a system-on-chip. A system-on-chip includes multiple cores, controllers or processors on integrated single microchip. The movement of information in such systems should be tightly controlled to ensure security goals. This is challenging because information can flow through timing channels, which are difficult to detect. In turn, hardware designs that are insusceptible to timing channels are difficult to provide because the designs can't be effectively tested for possible flaws that support timing channels.

Seminal work by Kemmerer [R. A. Kemmerer, "Shared resource matrix methodology: an approach to identifying storage and timing channels," ACM Trans. Comput. Syst., pp. 256-277, 1983], described an informal shared-resource matrix to pin-point potential timing channels. Effective at higher computing abstractions, this technique becomes difficult to apply to embedded and application-specific designs.

A number of Ad-hoc approaches [M. Hu, "Reducing timing channels with fuzzy time," in Proceedings of the 1991 IEEE Symposium on Security and Privacy, pp. 8-20, 1991], [. C. Wray, "An analysis of covert timing channels," in Proceedings of the 1991 IEEE Symposium on Security and Privacy, pp. 2-7, 1991] focus on introducing random noise into a system to make extracting information stochastically difficult. These methods make a timing channel harder to exploit (lower signal-to-noise ratio), but fail to identify whether a channel is timing-based. In addition, previous work using GLIFT has shown that strict information flow isolation can be obtained in a shared bus [J. Oberg, et al., "Information flow isolation in I2C and USB," in Proceedings of Design Automation Conference (DAC) 2011, pp. 254-259, 2011.], but the work provides no ability to relate information to timing.

Typical information flow tracking strategies target hardware description languages [X. Li et al, Caisson: a hardware description language for secure information flow," in PLDI 2011, pp. 109-120, 20], [T. K. Tolstrup, Language-based Security for VHDL. PhD thesis, Informatics and Mathematical Modelling, Technical University of Denmark, DTU, 2007]. This can be effective to prevent timing channels from developing. However, these languages force a designer to rewrite code in a new language. This is especially cumbersome when already designed hardware modules need to be analyzed.

Mobile systems and point of sale systems are of particular interest for security against information flows, including timing flows. The uses of mobile devices for trusted and confidential information exchanges continue to accelerate. Point of sale merchant systems have also proved vulnerable. Information stored and exchanges in these systems can include identity and financial account information.

Mobile phones, including phones having near field communication (NFC) capabilities, incorporate chips that allow the phones to securely store confidential information. Systems that interact with mobile systems, such as point of sale systems, also have security domains. Various secure domains are typically required to safeguard the flow of sensitive information, and to ensure that only specific secure domains have access to the information. The Smart Card Alliance has set forth guidelines for security in mobile payment platforms in Publication No. CPMC-09001, May 2009. Timing channels can be used to circumvent many such safeguards.

There are two general classes of information flows: explicit and implicit. Explicit information flows result from two subsystems directly communicating. For example, an explicit flow occurs when a host and device on a bus directly exchange data. Implicit information flows are much more subtle. Implicit flows generally leak information through behavior. Typical implicit information flows show up in hardware in the form of timing, where information can be extracted from the latency of operations.

For example, it is known that that side channel timing attacks can be used to extract secret encryption keys from the latencies of caches and branch predictors, for example. Cache timing attacks can obtain the secret key by observing the time for hit and miss penalties of the cache. Branch predictor timing channels are exploited in a similar manner, when information is leaked through the latency of predicted and mis-predicted branches. It has also been recognized that the shared bus in modern systems is a source of concern. A so-called bus-contention channel has been recognized as permitting covert transmission of information through the traffic on a global bus. See, e.g., W.-M. Hu, "Reducing timing channels with fuzzy time," Proceedings of the 1991 IEEE Symposium on Security and Privacy, pp. 8-20, 1991.

Information flow tracking is a common method used in secure systems to ensure that secrecy and/or integrity of information is tightly controlled. Given a policy specifying the desired information flows, such as one requiring that secret information should not be observable by public objects, information flow tracking helps detect whether or not flows violating this policy are present.

In general, information flow tracking associates data with a label that specifies its security level and tracks how this label changes as the data flows through the system. A simple example system has two labels: public and secret. A policy for the example system specifies that any data labeled as secret (e.g., an encryption key) should not affect or flow to any data labeled as public (e.g., a malicious process). Information flow tracking can also be extended to more complex policies and labeling systems. Information flow tracking has been used in all levels of the computing hierarchy, including programming languages [A. Sabelfeld and A. C. Myers, "Language-based information-flow security," IEEE Journal on Selected Areas in Communications, 2003], operating systems [M. Krohn, et al., "Information flow control for standard os abstractions," in SOSP 2007, pp. 321-334, 2007.], and instruction-set/microarchitectures [G. E. Suh, et al., "Secure program execution via dynamic information flow tracking," in ASPLOS 2004, pp. 85-96, 2004.], [J. R. Crandall et al., "Minos: Control data attack prevention orthogonal to memory model," in MICRO 2004, pp. 221-232, 2004.]. Recently, information flow tracking was used by Tiwari et al. [M. Tiwari, et al., "Execution leases: a hardware-supported mechanism for enforcing strong non-interference," in MICRO 2009, MICRO 42, pp. 493-504, 2009] at the level of logic gates in order to dynamically track the flows of each individual bit.

In the technique used by Tiwari et al., called gate level information flow tracking (GLIFT), the flow of information for individual bits is tracked as the bits propagate through Boolean gates; GLIFT was later used by Oberg et al. [J. Oberg, et al., "Information flow isolation in I2C and USB," in Proceedings of Design Automation Conference (DAC) 2011, pp. 254-259, 2011.] to test for the absence of all information flows in the I²C and USB bus protocols and by Tiwari et al. [M. Tiwari, et al., "Complete information flow tracking from the gates up," in Proceedings of ASPLOS 2009, 2009] to build a system that provably enforces strong non-interference. Further, it has been used to prove timing-based non-interference for a network-on-chip architecture in the research project SurfNoC [H. M. G. Wassel et al., "Surfnoc: a low latency and provably non-interfering approach to secure networks-on-chip.," in ISCA, pp. 583-594, ACM, 2013.] Since its introduction, Tiwari et al. have expanded GLIFT to "star-logic," which provides much stronger guarantees on information flow [M. Tiwari, et al., "Complete information flow tracking from the gates up," in Proceedings of ASPLOS 2009, 2009]. Generally, GLIFT tracks flow through gates by associating with each data bit a one-bit label, commonly referred to as taint, and tracking this label using additional hardware known as tracking logic, which specifies how taint propagates.

Gate-level information flow tracking (GLIFT) provides the ability to test for information flows. See, e.g., Oberg et al., "Information Flow Isolation in I2C and USB," DAC 2011, Jun. 5-10, 2011. Chip designers can test for information flows prior to fabricating a chip with GLIFT. However, GLIFT merely provides identification of information flows, and only with the single bit tag that is labeled taint. GLIFT tracks each individual bit in a system as the bits propagate through Boolean gates.

GLIFT can be applied, for example, after a design is synthesized into a gate-level netlist. With GLIFT, each gate is then associated with tracking logic. The function of the tracking logic depends on the function of the gate. The process is similar to a technology mapping, where each gate in the system is mapped to specific GLIFT logic. The result is a gate-level design of a finite state machine (FSM) that contains both the original logic and tracking logic. The resulting design equipped with tracking logic can be tested for information flows. To test for implicit timing flows, GLIFT accounts for all possible combinations of tainted data bits, and allows information flows to be observed. A designer can than make appropriate modifications to the chip design. Since GLIFT targets the lowest digital abstraction, it is able to detect and capture information leaking through time. However, GLIFT fails to provide any ability to separate timing information from functional information. Accordingly, a hardware designer using GLIFT would be unable to determine with a suspect flow is direct or indirect.

The Bus Covert Channel

Shared buses, such as the inter-integrated circuit (I²C) protocol, universal serial bus (USB), and ARM's system-on-chip AMBA bus, lie at the core of modern embedded applications. Buses and their protocols allow different hardware components to communicate with each other. For example, they are often used to configure functionality or offload work to co-processors (GPUs, DSPs, FPGAs, etc.). As the hardware in embedded systems continues to become more complex, so do the bus architectures themselves. The complexity makes it difficult to identify potential security weaknesses.

In terms of such security weaknesses, a global bus that connects high and low entities has inherent security problems. An example is a denial-of-service attack. In such an attack, a malicious device starves a higher integrity device from bus access. Another example is bus-snooping, in which a low device can learn information from a higher one. An inefficient and expensive solution that has been used to avoid these problems involves designers building physically isolated high and low buses.

The covert channels associated with common buses are well researched. One such channel, the bus-contention channel [W.-M. Hu, "Reducing timing channels with fuzzy time," in Proceedings of the 1991 IEEE Symposium on Security and Privacy, pp. 8-20, 1991.] arises when two devices on a shared bus communicate covertly by modulating the amount of observable traffic on the bus. For example, if a device A wishes to send information covertly to a device B, it can generate excessive traffic on the bus to transmit a 1 and minimal traffic to transmit a 0. Even if A is not permitted to directly exchange information with B, it still may transmit bits of information using this type of covert channel.

The two most well-known solutions to the bus-contention channel are clock fuzzing [W.-M. Hu, "Reducing timing channels with fuzzy time," in Proceedings of the 1991 IEEE Symposium on Security and Privacy, pp. 8-20, 1991.] and probabilisitic partitioning [ ] J. W. Gray III, "On introducing noise into the bus-contention channel," in Proceedings of the 1993 IEEE Symposium on Security and Privacy, pp. 90-98, 1993.]. Clock fuzzing utilizes a skewed and seemingly random input clock. The fuzzy clock makes it stochastically difficult for two covert devices to synchronize. This technique has limited appeal because it reduces the bandwidth of the bus [ ] J. W. Gray III, "On introducing noise into the bus-contention channel," in Proceedings of the 1993 IEEE Symposium on Security and Privacy, pp. 90-98, 1993.]. Probabilistic partioning permits devices to access the bus in isolated time slots in a round-robin fashion. Two modes are chosen at random: secure and insecure. In insecure mode, the bus operates in the standard fashion where devices contend for its usage. In secure mode, the bus is allocated to each device in a time-multiplexed round-robin manner. The contention phase burdens bandwidth also.

Cache Timing Channel

CPU caches in modern processors have been demonstrated to be highly susceptible to hardware timing channels [D. Gullasch, et al., "Cache games—bringing access-based cache attacks on AES to practice," in Proceedings of the 2011 IEEE Symposium on Security and Privacy, pp. 490-505, 2011]. Caches are typically built from faster and higher power memory technologies, such as SRAM, and sit between slower main memory (typically DRAM) and the CPU core.

The non-deterministic latencies of caches are a direct source of timing channels. When a memory region is referenced that is currently stored in the cache (a cache hit), the time to receive the data is significantly faster than if it needs to be retrieved from main memory (a cache miss). Many data encryption algorithms, such as the advanced encryption standard (AES), use look-up tables based on the value of the secret key. Since a look-up table will return a value in an amount of time that is directly correlated with whether or not the value is already cached, observing the timing of interactions with the look-up table produces valuable information about the secret key.

This vulnerability has been previously demonstrated to permit complete extraction of the secret key via different attacks. The attacks include trace-driven [O. Aciiçmez et al., "Trace-driven cache attacks on AES (short paper)," in *ICICS*, pp. 112-121, 2006], time-driven [D. J. Bernstein, "Cache-timing attacks on AES." Technical Report, 2005.], [D. A. Osvik, et al., "Cache attacks and countermeasures: the case of aes," in *Proceedings of the 2006 The Cryptographers' Track at the RSA conference on Topics in Cryptology*, pp. 1-20, 2006.], and access-driven [D. Gullasch, et al. "Cache games—bringing access-based cache attacks on AES to practice," in *Proceedings of the 2011 IEEE Symposium on Security and Privacy*, pp. 490-505, 2011]. Trace-driven attacks require an adversary to have detailed cache profiling information. The adversary therfore requires physical access or another wire to obtain fine granularity cache information. Time-driven attacks collect timing measurements over several encryptions by a remote server and correlate their running time to the value of the secret key. This type of attack has been shown capable of extracting a complete 128-bit AES key [D. J. Bernstein, "Cache-timing attacks on AES." Technical Report, 2005.]. Access-driven attacks exploit knowledge about which cache lines are evicted. In particular, a malicious process observes the latency of cache misses and hits and uses these patterns to deduce which cache lines are brought in/evicted, which in turn leaks information about the memory address (e.g., the secret key in AES table look-ups). This type of cache attacks has applications beyond just encryption, such as on virtulized systems [T. Ristenpart, et al., "Hey, you, get off of my cloud! Exploring information leakage in third-party compute clouds," in *Proceedings of CCS* 2009, pp. 199-212, 2009.].

Most previous work on timing channels has focused on techniques for identifying timing and storage channels in larger systems, but not specifically in hardware designs. Prior efforts have reduced or eliminated specific timing channels. Little work concerned systematic testing techniques for identifying such channels.

Wray [R. A. Kemmerer, "Shared resource matrix methodology: an approach to identifying storage and timing channels," *ACM Trans. Comput. Syst.*, pp. 256-277, 1983.] describes analysis of timing and storage channels in the VAX Virtual Machine Monitor. The timing channels are specific to the VAX VMM and a systematic testing method for identifying the channels is not described.

Kemmerer [R. A. Kemmerer, "Shared resource matrix methodology: an approach to identifying storage and timing channels," *ACM Trans. Comput. Syst., pp.* 256-277, 1983.] presents a shared matrix methodology for identifying timing channels. A matrix is created that compares shared resources, processes, and resource attributes. Based on these fields and some proposed criteria for a timing and storage channel, the matrix can be analyzed to determine whether or not a shared resource can be used as a side channel. This technique therefore requires the designer to construct such a matrix and determine the shared resources, but ultimately still does not provide a general technique for detecting timing channels in hardware.

Clock fuzzing is a technique for timing channel mitigation in secure systems [W.-M. Hu, "Reducing timing channels with fuzzy time," in *Proceedings of the 1991 IEEE Symposium on Security and Privacy*, pp. 8-20, 1991.]. Clock fuzzing works by presenting the system with a seemingly random clock to make it stochastically difficult for two objects to synchronize. Clock fuzzing is ineffective because it reduces the bandwidth of the timing channel and does not eliminate it entirely.

More recent work has focused on hardware information flow tracking. Dynamic information flow tracking (DIFT) [. E. Suh, et al., "Secure program execution via dynamic information flow tracking," in *ASPLOS* 2004, pp. 85-96, 2004.] tags information that comes from potentially untrusted channels and tracks them throughout a processor. This tag is checked before branches in execution are taken, and the branch is prevented if this information originated from an untrusted source. As demonstrated by Suh et al., DIFT is quite effective at detecting buffer overflow and format-string attacks, but works at too high of an abstraction to track information through timing channels. A similar tracking system [J. R. Crandall et al., "Minos: Control data attack prevention orthogonal to memory model," in *MICRO* 2004, pp. 221-232, 2004.] keeps an integrity bit on information and uses this bit to prevent potentially malicious branches in execution. Another example [M. Dalton, et al., "Raksha: a flexible information flow architecture for software security," in *ISCA* 2007, pp. 482-493, 2007] is a DIFT style processor that allows security policies to be reconfigured. Others have described a hardware security language [X. Li, et al., "Caisson: a hardware description language for secure information flow," in *PLDI* 2011, pp. 109-120, 2011.] that aids hardware designers by using programming language type-based techniques to prevent unintended information flows and eliminate timing channels.

Gate level information flow tracking (GLIFT) has been developed by the present inventors and colleagues. GLIFT [M. Tiwari, et al., "Execution leases: a hardware-supported mechanism for enforcing strong non-interference," in *MICRO* 2009, MICRO 42, pp. 493-504, 2009] works by tracking each individual bit in a hardware system. It is a general technique that has been applied to build an execution lease CPU [M. Tiwari, et al., "Crafting a usable microkernel, processor, and I/O system with strict and provable information flow security," in *Proceedings of ISCA* 2011, pp. 189-200, 2011.] and to analyze information flows in bus protocols [J. Oberg, et al., "Information flow isolation in I2C and USB," in Proceedings of Design Automation Conference (DAC) 2011, pp. 254-259, 2011.]. Recently, information flow tracking has also been used in hardware design languages. This work is effective at helping hardware designers to build secure hardware, but fails to provide a general technique for testing for timing channels.

SUMMARY OF THE INVENTION

A preferred method for detecting a timing channel in a hardware design includes synthesizing the hardware design to gate level. Gate level information flow tracing is applied to the gate level of the hardware design via a simulation to search for tainted flows. If a tainted flow is found, a limited number of traces are selected. An input on the limited number of traces is simulated to determine whether the traces are value preserving with respect to taint inputs, and to determine that a timing flow exists if the traces are value preserving with respect to the taint inputs.

A preferred method for detecting a timing channel in a hardware design includes synthesizing the hardware design to gate level. Gate level information flow tracing is applied to the gate level of the hardware design via a simulation to search for tainted flows. If a tainted flow is found, a limited number of traces are selected. An input on the limited number of traces is simulated to determine whether the traces are value preserving with respect to taint inputs, and to determine that a timing flow exists if the traces are value preserving with respect to the taint inputs.

BRIEF DESCRIPTION OF THE DRAWINGS

FIGS. 1A-C respectively illustrate an example AND gate, a partial truth table for the tracking logic of an AND gate, and tracking logic for an AND that has been modified to gate level for tracking via a method of the invention;

FIGS. 5A-5C illustrate standard I²C configurations and how the configurations can (FIG. 5B) covertly communicate a 1 to $S_2$ by sending an acknowledgement or (FIG. 5C) can communicate a 0 covertly to $S_2$ by sending a negative-acknowledgement;

DESCRIPTION OF THE PREFERRED EMBODIMENTS

Figure 2:
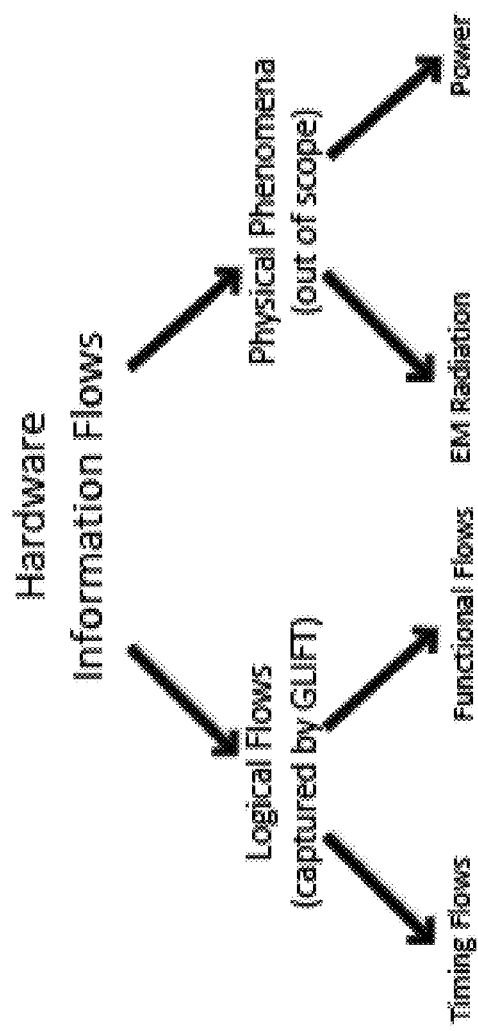
FIG. 2 illustrates classes of information flows in hardware designs that can be identified through the invention and physical phenomena that are not considered.

Another preferred method for detecting a timing channel in a hardware design receives a hardware design. At least one portion of the hardware design is synthesized with gate level primitives. Tracking logic is added including the gate level primitives to monitor information flow through the gate level primitives. Sets of inputs to the gate level primitives including added taint inputs are tracked to identify information flows by generating outputs from the gate level primitives for every clock tick while changing only taint inputs. Timing flows are separated from informational flows by conducting input to output deterministic traces to isolate functional flows in the information flows.

A preferred method for detecting a timing channel in a hardware design includes synthesizing the hardware design to gate level. Gate level information flow tracing is applied to the gate level of the hardware design via a simulation to search for tainted flows. If a tainted flow is found, a limited number of traces are selected. An input on the limited number of traces is simulated to determine whether the traces are value preserving with respect to taint inputs, and to determine that a timing flow exists if the traces are value preserving with respect to the taint inputs.

A preferred method for detecting a timing channel receives a hardware design and receives or generates a set of test taint inputs. Response of the hardware design to the test taint inputs is simulated while tracking flow of information through the design. A search is conducted for differences between timing flows that don't affect outputs in the hardware design and functional flows that do affect outputs in the hardware design in response to said simulating. The steps are repeated, if needed, to identify possible timing flows in the hardware design. In a preferred embodiment simulating includes an initial pre-processing of the hardware design. The pre-processing can include synthesizing at least a portion of the hardware hardware design. The receiving or generating can include selecting a subset of input deterministic traces for the tracking logic. The hardware design can be, for example, a design in a hardware description language, and the synthesizing synthesizes the design into a gate level netlist, and the tracking logic is added to every gate level primitive in the netlist.

Simulating can include tracking additional signals not specified in the hardware design. Additional signals comprise modified versions of signals specified in the hardware design. The additional signals can track taint of signals specified in the hardware design.

Simulating can include finding a subset of taint inputs that cause a changing in the timing of outputs without changing output values. Finding can begin with selecting input traces which differ in values of security critical inputs. Finding can begin with a random selection of input traces. Finding can begin with selecting input traces aided by information provided by a hardware designer.

Preferred embodiments of the invention use GLIFT, but unlike prior GLIFT, provides a fully deterministic testing method for detecting hardware timing channels to make secure hardware easier to design and test. The invention provides a method for testing for timing channels in computer hardware. Preferred methods of the invention focus on the hardware design itself, so that a system can be built with a secure root-of-trust, thus providing security assurance for the higher abstractions. Preferred embodiments of the invention can be directly applied to existing hardware cores without requiring code rewriting.

Preferred embodiment methods and analysis tools use gate-level information flow tracking to detect information flows within a system. If information flows exist, then the flows are tested to determine whether the flows are merely timing flows or if the flows are functional flows. A functional flow is analyzed as a flow that for a given set of inputs to a circuit system or domain affects values output by the circuit system or domain. A timing flow exists when changes in the input affects how long a computation takes to execute.

A fully deterministic framework is provided by methods and systems of the invention to identify functional flows in detected information flows. The framework can confirm or rule out the existence of functional flows, and thereby convert hardware information flow tracking to an unambiguous technique to identify and effectively isolate timing flows. The framework has been demonstrated in two example applications: a shared bus (I²C) and a cache in a MIPS-based processor (reduced instruction set architecture from MIPS Technologies), both of which were written in Verilog HDL and then simulated in a variety of scenarios. The experiments show that methods of the invention can separately identify timing and functional.

Preferred methods and systems of the invention modify GLIFT to provide a fully deterministic model that isolates timing information from other flows of information. The model is completely specified to separate timing and functional flows. An embodiment of the invention demonstrates that a shared bus, for example, can be analyzed to identify timing flows and determine if the flows are in threat model are system dependent.

Preferred methods and systems of the invention provide a hardware design test method and system that can examine a hardware to test the design for the potential existence of timing channels that might contradict design goals, e.g. by adversely affecting intended confidentiality or integrity goals for a particular core in a system-on-chip or a security domain in a multi-security domain system. A method and system of the invention can determine whether or not an information leak is a timing or direct threat.

An example hardware design test method and system can be applied, for example, to test the design of hardware system caches and the interaction of caches with various cores against concerns related to timing-based interference. A particular application would benefit a hardware designer, for example, that is designing a system-on-chip and wishes to isolate high-integrity cores from less trusted third-party ones, while still allowing resource sharing. A design can be tested with the invention prior to fabrication to reveal timing signal vulnerabilities. A designer can then modify a design to mitigate timing effects that the less trusted cores have on the high integrity ones. In some situations, identified timing flows might be of no concern. The attack space of the cache or the timing effects on high-integrity cores could be demonstrated through the testing as being outside the threat model of the designer. Regardless, this invention provides hardware designers with the ability to identify these timing channels. In other situations, the designer can discover threats requiring a design change. The test method and system provides an accurate evaluation tool to test threat models.

Preferred methods of the invention can be implemented via computer code stored on a non transient medium. Methods of the invention can also be implemented in hardware devices and systems that connected to microprocessors or other devices being evaluated for timing channels. Those knowledgeable in the art will appreciate that embodiments of the present invention lend themselves well to practice in the form of computer program products. Accordingly, it will be appreciated that embodiments of the present invention may comprise computer program products comprising computer executable instructions stored on a non-transitory computer readable medium that, when executed, cause a computer to undertake methods according to the present invention, or a computer configured to carry out such methods. The executable instructions may comprise computer program language instructions that have been compiled into a machine-readable format. The non-transitory computer-readable medium may comprise, by way of example, a magnetic, optical, signal-based, and/or circuitry medium useful for storing data. The instructions may be downloaded entirely or in part from a networked computer. Also, it will be appreciated that the term "computer" as used herein is intended to broadly refer to any machine capable of reading and executing recorded instructions. It will also be understood that results of methods of the present invention may be displayed on one or more monitors or displays (e.g., as text, graphics, charts, code, etc.), printed on suitable media, stored in appropriate memory or storage, etc.

Preferred embodiments of the invention provide a framework for testing hardware for side channels by identifying whether information can be leaked based on how long a hardware component takes to execute its normal function. Embodiments of the invention leverage GLIFT. GLIFT tracks flow of information through logic gates using a single bit label in hardware to monitor the security level of each individual data bit. Preferred embodiments provide a fully deterministic model in conjunction with GLIFT to identify these information flows. The preferred methods further identify functional flows using a fully deterministic model. Intuitively, a functional flow exists for a given set of inputs to a system if their values affect the values output by the system (for example, changing the value of a will affect the output of the function $f(a; b):=a+b$), while a timing flow exists if information about the input can be learned from the latency of the execution. While GLIFT will tell the designer only if any such flow exists, the fully deterministic model determines whether or not the system contains specifically functional flows. Used in conjunction GLIFT, this method permits determination of whether timing flows (and therefore channels) exist. If GLIFT determines that a flow does exist but the method can demonstrate that no functional flow exists, then the method determines that a timing flow must exist. Methods of the invention have been tested to successfully identify a timing channel in a processor cache.

The invention is generally applicable to industries that require security (trusted platforms, secure storage, network devices, etc.) and/or integrity (real-time operating systems, critical embedded system controllers, etc.) would benefit greatly from the present invention. Most any system that relies on embedded microcontrollers/cores would benefit, including, for example, medical equipment, automobiles, airplanes, and building security systems. Methods of the invention can formally validate security and integrity properties spanning across hardware and software, enabling more efficient solutions while maintaining system integrity.

Before introducing deterministic methods of the invention, formal definitions are first set forth. First, time is defined with respect to the system clock.

Definition 1.

The clock is a function with no inputs that outputs values of the form $b \in \{0, 1\}$. A clock tick is the event in which the output of the clock changes from 0 to 1. A time t is the number of clock ticks that have occurred. T is the set of possible values of t.

With this definition, some stateless hardware component will output a stream of ticks, and a separate stateful component will measure the number of ticks and can be used to keep track of time.

Definition 2.

For a set Y, a discrete event is the pair $e:=(y,t)$ for $y \in Y$ and $t \in T$ (recall is the set of all possible time values). Functions that recover the value and time components of an event are $val(e)=y$ and $time(e)=t$ respectively.

Definition 3.

For a value $n \in \mathbb{N}$ and a set Y, a trace $A(Y,n)$ is a sequence of discrete events $\{e_i=(y_i,t_i)\}_{i=1}^{n}$ that is ordered by time; i.e., $time(e_i) < time(e_{i+1})$ for all i, $1 \le i \le n$, and such that $val(e_i) \in Y$, $time(e_i) \in T$ for all i, $1 \le i \le n$. When the values of Y and n are clear, they are omitted and the trace is simply A.

The definition of event is broad, such that any value at any time can be considered an event. By example, a system that outputs some value on every clock tick that is run for k clock ticks with each output recorded, results in a trace of size k. Redundant events in which the system outputs the same value for many clock ticks while performing some computation are not of interest. In this case, only the value of the output changes produces an event of interest. This can be defined as a distinct trace.

Definition 4.

For a trace $A(Y,n)$, the distinct trace of A is the largest subsequence $d(A) \subseteq A(Y,n)$ such that for all $e_{i-1}, e_i \in d(a)$ it holds that $val(e_i) \neq val(e_{i-1})$.

Constructing the distinct trace $d(A)$ of A is straightforward. First, include the first element of A in $d(A)$. Next, for each subsequent event e, check whether the last event e' in $d(A)$ is such that $val(e')val(e)$; if this holds, then skip e (i.e., do not include it) and if it does not then add e to $d(A)$. As an example, consider a trace of two-bit values $A=((00,1), (00,2), (01,3), (01,4), (11,5), (10,6))$. Then the distinct trace $d(A)$ will be $d(A):=((00,1), (01,3), (11,5), (10,6))$, as the values at time 2 and 4 do not represent changes and will therefore be omitted.

With these definitions in hand, a finite state machine system F can be defined that takes as input a value x in some set X and returns a value Y in some set Y. To be fully general and consider systems that take in and output vectors rather than single elements, assume that $X=X_1 \times \ldots \times X_n$ and that $Y=Y_1 \times \ldots \times Y_m$ for some $m,n \geq 1$, which means that an input x looks like $x(x_1, \ldots, x_n)$ and an output y looks like $t=(y_1, \ldots, y_m)$. To furthermore acknowledge that the system is not static and thus both the inputs and outputs might change over time, we instead provide as input a trace $A(X,k)$ for some value k, and assume our output is a trace $A(Y,k)$.

Definition 5.

A finite state machine (FSM) F is defined as $F=(X, Y, S, \delta, \alpha)$, where X is the set of inputs, Y the set of outputs, and S the set of states. $\delta: X \times S \rightarrow S$ is the transfer function and $\alpha: X \times S \rightarrow Y$ is the output function.

With circuit implementations of finite state machines, both $\delta$ and $\alpha$ are represented as combinational logic functions. In addition, both $\delta$ and $\alpha$ can be called on a trace. $B=\alpha(A,s_0)$ generates a trace of output events $B=(e_0, e_1, \ldots e_k)$ during the execution on input trace A starting in state $s_0$. This notation describes $\alpha$ executing recursively; it takes a state and trace as input and executes to completion producing an output trace. When the starting state is assumed to be the initial state, the notation $\alpha(A)$ is used.

Of concern are flows of information from a specific set of inputs (the subset of inputs which are of security concern). Preferred embodiments formalize how to constrain the others. Recall that an information flow exists for a set of inputs to the system F if their values affect the output (either the concrete value or its execution time). One way to then test whether or not these inputs affects the output is to change their value and see if the value of the output changes; concretely, this would mean running F on two different traces, in which the values of these inputs are different. In order to isolate just this set of inputs, however, it is necessary to keep the value of the other inputs the same. To ensure isolation, Preferred embodiments define what it means for two traces to be value preserving.

Definition 6.

For a set of inputs $\{x_i\}_{i \in I}$ and two traces $A(X,k)=(e_1, \ldots, e_k)$ and $A(X,k)'=(e_{1'}, \ldots, e_{k'})$, the traces are value preserving with respect to I if for all $e_i \in A$ and $e_{i'} \in A'$ it is the case that $time(e_i)=time(e_{i'})$, and if $val(e_i)=(a_1, \ldots, a_n)$ and $val(e_{i'})=(a_{1'}, \ldots, a_{n'})$, then $a_i=a_{i'}$ for all $i \notin I$.

If two traces are value preserving, then by this definition the only difference between them is the value of the tainted inputs $\{x_i\}_{i \in I}$. Taint can be, as an example, secret data that would be tainted and then tracked to ensure that it is not leaking to somewhere harmful. In this example, the set of secret inputs would be the set I.

For use in the invention, Preferred embodiments provide formal definitions of tracking logic and taint. First, it is important to understand how a "wire" in a logic function is tainted.

Definition 7 (Taint)

For a set of wires (inputs, outputs, or internals) X, the corresponding taint set is $X_t$. A wire $x_i$ for $x=(x_1, \ldots, x_i, \ldots, x_n) \in X$ is tainted by setting $x_{it}=1$ for $x_t \in X_t$ and $x_t=(x_{1t}, \ldots, x_{it}, x_{nt})$.

In this definition, the elements of X and $X_t$ are given as vectors; i.e., an element $x \in X$ has the form $x=(x_1, \ldots x_n)$ for $n \geq 1$. For single-bit security labels, $x \in X$ and its corresponding taint vector $x_t \in X_t$ are the same length.

With the definition for taint, preferred embodiments can formally define the behavior of a tracking logic function and information flow with a tracking logic function.

Definition 8 (Tracking Logic)

For a combinational logic function $f: X \rightarrow Y$, the respective tracking logic function is $f_t: X_t \times X \rightarrow Y_t$, where $X_t$ is the taint set of X and $Y_t$ the taint set of Y. If $f(x_1, \ldots, x_n)=(y_1, \ldots, y_m)$, then $f_t(x_1, \ldots, x_n, x_{1t}, \ldots, x_{nt})=(y_{1t}, \ldots, y_{mt})$, where $y_{it}=1$ indicates that some tainted input $x_j$ (i.e., an input $x_j$ such that $x_{jt}=1$) can affect the value of $y_i$.

Definition 9 (Information Flow)

For a combinational logic function $f: X \rightarrow Y$ and a set of inputs $\{x_i\}_{i \in I}$, an information flow exists with respect to an output $y_j$ if $f_t(x_t)=(y_1, \ldots, y_{j-1}, 1, y_{j+1}, \ldots, y_m)$, where each entry of $x_{it}$ is 1 if $i \in I$ and 0 otherwise. If there exists an index j such that $y_j=1$, an information flow exists.

To understand how the tracking logic is used, consider a function with public and secret labels; then a label $x_{it}$ is 1 if $x_i$ is secret, and 0 otherwise. When considering a concrete assignment $(a_1, \ldots a_n)$ with each $a_j$ being 0 or 1, running $f(a_1, \ldots, a_n)$ will produce the data output $(y_1, \ldots, y_i, \ldots, y_m)$, and running $f_t(a_1, \ldots, a_n, a_{1t}, \ldots, a_{1n})$ will indicate which tainted input can affect the values of which outputs (by outputting $y_{it}=1$ if a tainted input affects the value of $y_i$ and 0 otherwise). With references to the sample function, if some output $y_{it}=1$ from $f_t$, a secret input affects the output $y_i$ of $f$. If $y_i$ is public, then this flow would violate the security policy.

Typically, each individual gate and flip-flop is associated with such tracking logic in a compositional manner. In other words, for each individual gate (AND, OR, NAND, etc.), tracking logic is added monitors the information flow through this particular gate. By composing the tracking logic for each gate and flip-flop together, an entire hardware design consisting of all the original inputs and outputs can be formed, with the addition of security label inputs and outputs can be provided. Care must be taken to derive the tracking logic for each gate separately, however, as the way in which the inputs to a gate affect its output vary from gate to gate.

As an example, consider the tracking logic for a AND gate as shown in FIGS. 1A-1C. By definition, if some input of a AND gate is 0, the output will always be 0 regardless of the other inputs. Thus, with inputs $x_1=1$ and $x_2=0$ with security labels $x_{1t}=1$ and $x_{2t}=0$ as shown in FIGS. 1B-1C, then the output will actually be untainted even though $x_{1t}=1$, because the value of $x_1$ has no observable effect on the output of the gate (again, because $x_2=0$ and thus the output will be 1 regardless). By building a truth table for every gate primitive, tracking logic can be derived in this manner and stored in a library. The tracking logic can then be applied to the gate in a manner similar to technology mapping. As an example of how to compose these tracking logics, consider a 2-input multiplexer (MUX), which is composed of two AND gates and a single OR gate where the output of the AND gates feed the inputs of the OR gate. First, the tracking logic for each AND gate and the single OR gate is generated. Then, the output of the tracking logic for each AND gate is fed as inputs to the tracking logic for the OR gate.

To apply modified GLIFT of the invention, a hardware description of the design is written in a hardware description language (HDL), such as Verilog or VHDL, and this description is then synthesized into a gate-level netlist using traditional synthesis tools such as Synopsys' Design Compiler. A gate-level netlist is a representation of the design completely in logic gates and flip-flops. Next, the GLIFT logic is added in a compositional manner; i.e., for every gate in the system, add associated tracking logic which takes as input the original gate inputs and their security labels and outputs a security label. Given a security policy such as the confidentiality example (i.e., secret inputs should not flow to the public output), GLIFT can then be used to ensure that the policy is not violated by checking that the output of the tracking logic $f_t$ is not 1. It is important to remember that $f_t$ is defined to report 1 iff a tainted input can actually affect the output. In other words, it will report 1 if at any instant in time a tainted input can affect the value of the output.

One of GLIFT's key properties is that it targets a very low level of computing abstraction; at such an abstraction, all information becomes explicit. In particular, because GLIFT tracks individual bits at this very low level, it can be used to explicitly identify timing channels.

A clear understanding of timing channels can be aided by a definition of a timing channel familiar to hardware designers. Preferred embodiments define specifically a timing-only flow as an input that affects only the timestamp of output events and not the values. To be clear, preferred embodiments are concerned with timing leaks at the cycle level. Stated differently, preferred embodiments assume that an attacker does not have resources for measuring "glitches" within a combinational logic function itself. Rather, an attacker can only observe timing variations in terms of number of cycles at register boundaries. With these assumptions, it can be demonstrated that the present modified version of GLIFT can capture such channels and identify timing only flows.

Definition 10. (Timing-Only Flow)

For a FSM F with input space X and output function $\alpha$, a timing-only flow exists for a set of inputs $\{x_i\}_{i \in I}$ if there exists some value $k \in T$ and two input traces $A(X,k)$ and $A(X,k)'$ such that A and A' are value preserving with respect to I, and for $B = \alpha(A)$val and $B' = \alpha(A')$ it is the case that val($e_i$)=val($e_{i'}$) for all $e_i \in d(B)$ and $e_i \in d(B')$ and there exist $e_j \in d(B)$ and $e_{j'} \in d(B')$ such that time($e_j$)≠time($e_{j'}$).

This definition captures the case in which a set of inputs affect only the time of the output. In other words, changing a subset of the tainted inputs will cause a change in the time in which the events appear on the output, but the values themselves remain the same. Before this definition can be used to prove that GLIFT captures timing-only channels, the GLIFT FSM $F_t$ must be defined.

Referring back to Definition 5, a FSM consists of two combinational logic functions $\alpha$ and $\delta$. Thus, there exists tracking logic functions $\alpha_t$ and $\delta_t$ according to Definition 8. Using this property, preferred embodiments can define the GLIFT FSM $F_t$, which will be used to prove that GLIFT detects timing-only flows.

Definition 11.

Given a FSM F=(X, Y, S, $\delta$, $\alpha$), the FSM tracking logic $F_t$ is defined as $F_t$=(X, $X_t$, $Y_t$, S, $S_t$, $\delta_t$, $\alpha_t$) where X and S are the same as in F, $S_t$ is the set of tainted states, $X_t$ is the set of tainted inputs, $Y_t$ is the set of tainted outputs, $\delta_t$ the tracking logic of $\delta$ and $\alpha_t$ the tracking logic function of $\alpha$.

With these definitions are in place, one can prove that GLIFT can detect timing-only flows.

Theorem 1.

The FSM tracking logic $F_t$ of a FSM F captures timing-only channels.

Proof.

Suppose there exists a timing-only channel for a finite state machine F with respect to the set of tainted inputs I. By Definition 10, this means there must exist value-preserving traces $A(X,k)$ and $A(X,k)'$ (such that, for $B=\alpha(A)$ and $B'=\alpha(A')$, val($e_i$)=val($e_{i'}$) for all $e_i \in d(B)$ and $e_i \in d(B)$, but there exist $e_j \in d(B)$ and $e_{j'} \in d(B')$ such that time($e_j$)≠time($e_{j'}$). Since $e_j \in d(B)$ implies that $e_j \in B$ (and likewise for $e_{j'}$), this means that B≠B'.

F generates an output every clock tick, so for all $e_j \in B$ and $e_{j'} \in B'$, time($e_j$)=time($e_{j'}$), and thus there must exist some $e_j \in B$ and $e_{j'} \in B'$ such that val($e_j$)≠val($e_{j'}$) (because B≠B'). By Definition 6, all input values remain the same for all $i \notin I$, such that the only difference between them is in the tainted inputs, and thus the difference in output must have been caused by a tainted input. By Definition 8, $\alpha_t$ would thus have an output of $(y_{1t}, \ldots, y_{it}=1, \ldots, y_{mt})$, as the value if $y_i$ in the output of $\alpha$ was affected by a tainted input. By Definition 9, this means GLIFT has indicated an information flow must exist. As the only possible flow is timing-based, this statement of GLIFT thus captures timing-only flows.

Since GLIFT operates at the lowest level of digital abstraction, all information flows become explicit. Thus, if at any instant in time a tainted input can affect the value of the output, GLIFT will indicate so by definition. At the FSM abstraction, as defined in Definition 10, this type of behavior often presents itself as a timing channel. This proof demonstrates that GLIFT applied with the invention can in fact identify these types of information flows. The next step is to separate timing flows from functional flows.

In FIG. 2, GLIFT allows system designers to determine if any information flows exist within their systems even those through timing-channels. At the digital level, there are two possible types of flows which are designated as functional flows and timing. A functional flow exists for a given set of inputs to a system if their values affects the values output by the system (for example, changing the value of a will affect the output of the function $f(a,b):=a+b$), while a timing flow exists if changes in the input only affect how long the computation takes to execute. GLIFT in the prior art only can't separate flows, and demonstrates only that timing and/or functional flows exist. The invention provides a fully deterministic model for determining whether or not a system contains specifically functional flows. Applying GLIFT, methods of the invention determine what type of flow is occurring. If GLIFT determines that no flow exists, then there is no flow. If GLIFT instead determines that a flow does exist but one can demonstrate that no functional flow exists, then the method identifies that a timing flow must exist. In another case, GLIFT determines that a flow exists and the method determines that a functional flow does exist. In this instance the method identifies the existence of functional flows, but does not separately identify timing flows.

Finding Function Flows

Figure 3:
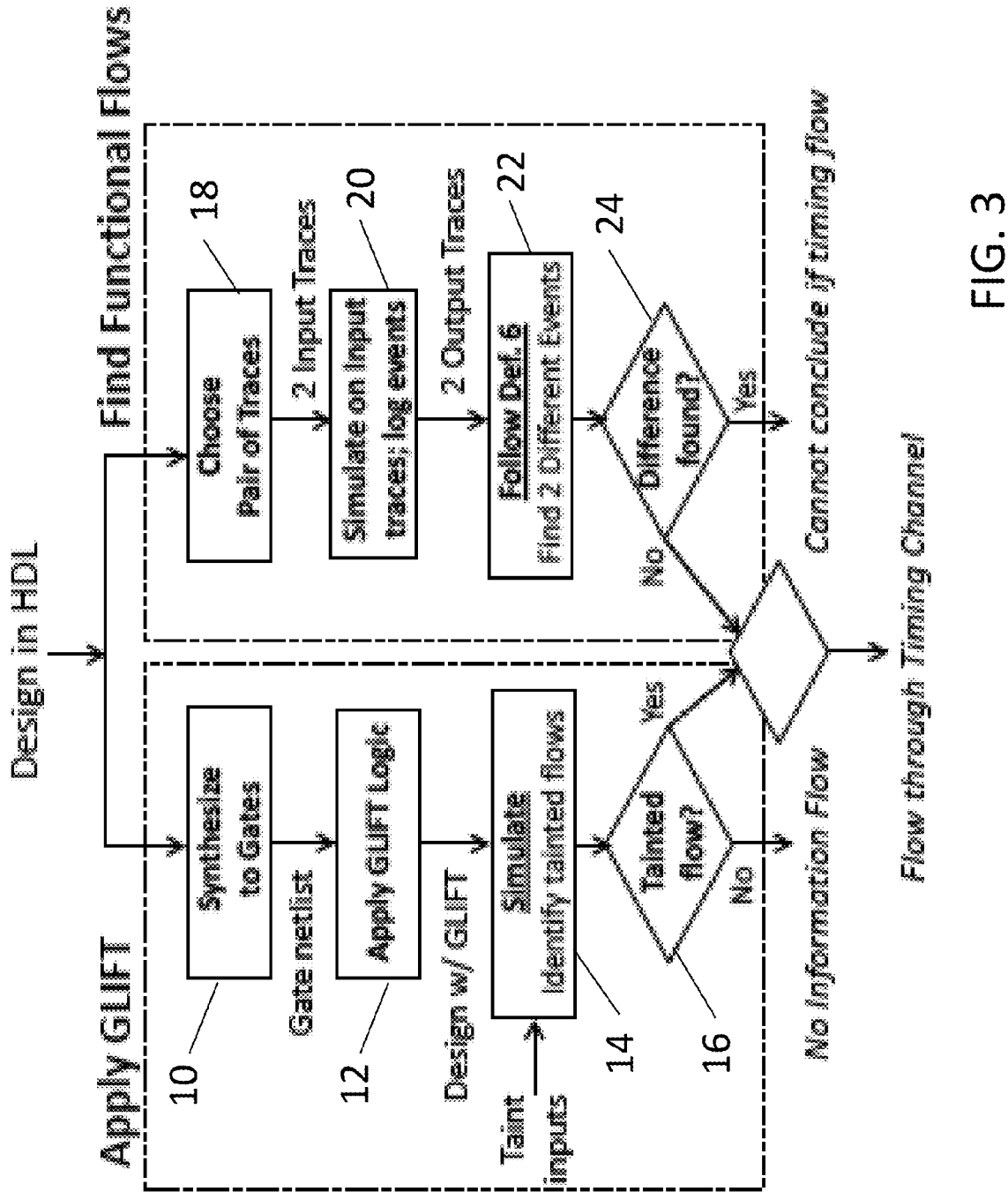
FIG. 3 is a flowchart illustrating a preferred method to isolate timing channels.

A testing framework is shown in FIG. 3. Here GLIFT is modified to find functional flows to isolate timing information. If GLIFT determines that there is no flow, then there is no functional nor timing information flow. If, however, GLIFT determines there is a flow and no functional flow is identifies, then the method determines that the information flow occurred from a timing channel. A proof begins with the strongest possible definition and then weakens it to make it more amenable to testing techniques familiar to hardware designers. In FIG. 3, generally, synthesis 10 of a hardware design is conducted, and then GLIFT logic is applied 12 to a gate netlist. Simulation is conducted 14 to identify tainted flows 16. The separation between functional and timing flows in preferred embodiments only chooses 18 a pair of selected traces, though more can be selected to strengthen the method at the cost of some added overhead. Simulation is conducted on the traces and events are logged 20. A search for different events 22 determines if there is a difference 24 at an output as a result of a change in input. If there is, then timing flows can be identified because functional flows exist. Otherwise, a timing flow is unambiguously identified.

Definition 12 (Functional Flow)

For a deterministic FSM F with input space X and output function $\alpha$, a functional flow exists with respect to a set of inputs $\{x_i\}_{i \in I}$ if there exists some value $k \in T$ and two input traces $A(X,k)$ and $A(X,k)'$ such that A and A' are value preserving with respect to I, and for $B:=\alpha(A)$ and $B':=\alpha(A')$ it is the case that there exists $e_i \in d(B)$ and $e_{i'} \in d(B')$ such that $val(e_i) \neq val(e_{i'})$.

According to Definition 12, if there is some functional flow from this set of inputs to the output, then there exist input traces of some size k that will demonstrate this flow; i.e., if a different output pattern is observed by changing only the values of these particular inputs, then their value does affect the value of the output and a functional flow must exist. In practice, however, this definition carries a large overhead: a system designer wanting to isolate timing flows by ensuring that no functional flows exist would have to look, for every possible value of k, at every pair of traces of size k in which the value of this set of inputs differs in some way; only upon finding no such pair for any value of k would the designer be able to conclude that no functional flow exists. An altered, relaxed definition can provide some guarantees (albeit weaker ones) about the existence of functional flows, without requiring an exhaustive search (over a potentially infinite space).

Definition 13 (Functional Flow)

For a deterministic FSM F with input space X and output function $\alpha$, a functional flow exists with respect to a set of inputs $\{x_i\}_{i \in I}$ and an input trace $A(X,k)$ if there exists an input trace $A(X,k)'$ such that A and A' are value preserving with respect to I and for $B:=\alpha(A)$ and $B':=\alpha(A')$ it is the case that there exists $e_i \in d(B)$ and $e_{i'} \in d(B')$ such that $val(e_i) \neq val(e_{i'})$.

Instead of only examining the set of inputs, the definition also considers fixing the first trace. If one constructs a second trace given this first trace to ensure that the two are value preserving, then comparing the distinct traces of the output will tell us if a functional flow exists for the trace. Once again, however, the method considers what a system designer would have to do to ensure that no functional flow exists: given the first trace A, the designer would have to construct all possible traces A'; if the distinct traces of the outputs were the same for all such A', then the designer could conclude that no functional flow existed with respect to A. Once again, this search space might be prohibitively large, so another meaningful relaxation of the definition is provided.

Definition 14 (Functional Flow)

For a deterministic FSM F with input space X and output function $\alpha$, a functional flow exists with respect to a set of inputs $\{x_i\}_{i \in I}$ and input traces $A(X,k)$ and $A(X,k)'$ that are value preserving with respect to I if for $B:=\alpha(A)$ and $B':=\alpha(A')$ it is the case that there exists $e_i \in d(B)$ and $e_{i'} \in d(B')$ such that $val(e_i) \neq val(e_{i'})$.

While this definition provides the weakest guarantees on the existence of a functional flow, it allows for the most efficient testing, as all that is required is to pick only two traces. In addition, the guarantees of this definition are not as weak as they might seem: they say that, given the output B, by observing B' as well, no additional information about the inputs $\{x_i\}_{i \in I}$ is learned than was learned just from seeing B. While this does not imply the complete lack of any functional flow, it does provide evidence toward that conclusion. This can be strengthened via methods of the invention by running the procedure with additional, carefully selected pairs of traces. For example, when testing timing information flows in a processor cache when performing data encryption. The traces should be chosen such that the secret key is different. In general, if the choice of traces is not clear, a pair of random traces may be chosen for the analysis. By selection a small set of pairs, a high level of guarantee is provided with a very small search space.

The system F can be deterministic, and can be implemented more efficiently than might first be apparent. Only flows detectable by GLIFT are of interest. Physical processes that can be used to generate randomness, such as the current power supply or electromagnetic radiation, are therefore not considered explicitly. Randomness can be addressed, however, in the form of something like a linear feedback shift register (LFSR), which is in fact deterministic given its current state; the randomness produced by an LFSR can therefore be held constant between two traces by using the same initial state.

An Example: Fast/Slow Multiplier

To build intuition for how the present model determines whether or not a functional flow exists, consider a simple multiplier system.

Figure 4B:
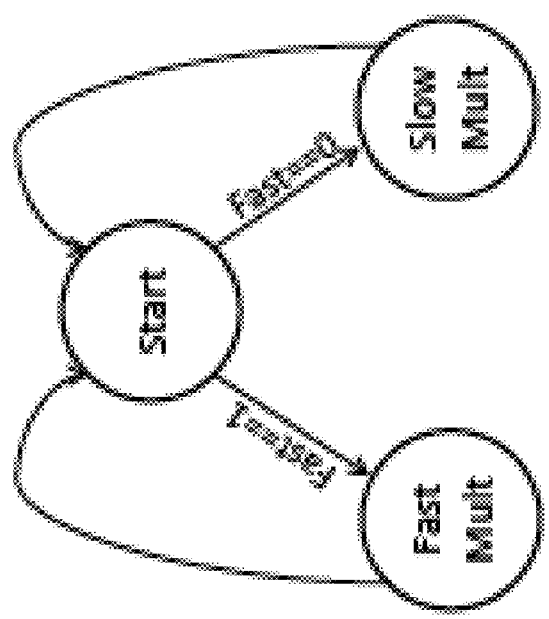
FIGS. 4A & 4B show the inputs and outputs of a fast multiplier of a system S that takes in two multi-bit inputs A and B and two single-bit inputs, fast and a clock input clk, and outputs P:=A×B, the system first picks an ALU to use based on the value of fast and then uses that ALU to perform the multiplication.
Figure 4A:
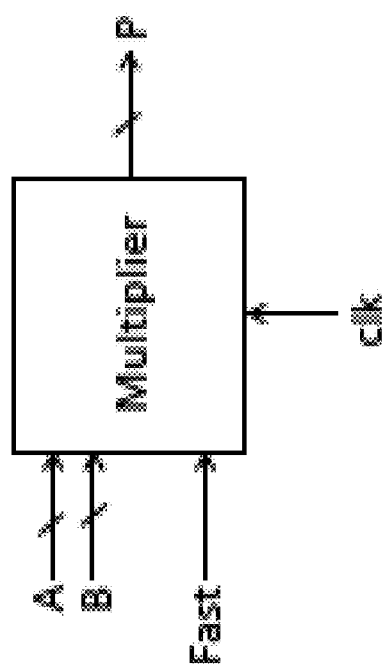

Shown in FIGS. 4A and 4B, the system consists of a pair of two-input multipliers, one fast and one slow. On inputs A, B, and fast, the system will use fast to determine which of the hardware multipliers to use. For both A and B, there is a clear functional flow from the input to the output, as $P:=A \times B$. The input fast, however, has no effect on the value of the output P, as it simply selects whether to perform a fast or slow multiply. There is therefore no functional flow from fast to the output, but there is a clear timing flow. The latency with which P is computed is highly dependent on the value of fast.

To confirm that the flow from fast must be timing rather than functional, this input is evaluated through the present methods. Using as F, the system in FIGS. 4A and 4B, the input space can be defined as $X:=\mathbb{Z}, \mathbb{Z}, \{0,1\}$); i.e., all tuples consisting of two integer values and one bit, and the present output space to be $Y:=\mathbb{Z}$. Of interest, is whether or not a functional flow exists for fast, so this is defined to be the present set of inputs. Picking values $A_0$ and $B_0$ for A and B respectively, and setting the first trace to be $A:=((A_0, B_0, 0), t_0)$; i.e., the single event (at an arbitrary time $t_0$) in which $A_0$ and $B_0$ are multiplied using the slow ALU. Then set the second trace to be $A':=((A_0, B_0, 1), t_0)$, and run these two traces to obtain output traces $B=(P,t)$ and $B'=(P',t')$. As $A_0$ and $B_0$ were the same for both traces, $P=P'$ and thus $val(e_i)=val(e_{i'})$ for all $e_i \in d(B)$ and $e_{i'} \in d(B')$, meaning no functional flow exists with respect to these two traces. This also provides evidence that no functional flow exists for fast at all, although further testing would likely be required to rule out this functional flow completely.

Detecting Timing Flows in I²C

This example application of the invention effectively shows that finding hardware timing channels in practice is non-trivial, and testing for them benefits from some intuition (for example, knowing which traces to pick). Both clock fuzzing and probabilistic partitioning discussed in the background have proven to be effective at reducing, the bus-contention channel. The prior techniques sacrifice bandwidth and do not provide a deterministic method to establish whether information might leak through timing channels associated with the bus architecture. The invention provides a use of GLIFT to prove that certain information flows in I²C occur through timing channels.

The inter-integrated circuit (I²C) protocol is a simple 2-wire bus protocol first proposed by Philips [I2c manual." http://www.nxp.com/documents/application_note/ AN10216.pdf, March 2003.]. We chose to look specifically at I²C because of both its wide usage in embedded applications for configuring peripherals and its However, the techniques presented here are applicable to more sophisticated architectures or protocols.

FIGS. 5A-5C illustrate standard I²C configurations and how the configurations can (FIG. 5B) covertly communicate a 1 to by sending an acknowledgement or (FIG. 5C) can communicate a 0 covertly by sending a negative-acknowledgement. In the I²C protocol FIGS. 5A-5C, a "master" 30 of the bus initiates a transaction by first sending a start bit by pulling down the data line (SDA) with the clock line (SCL) high. "Slaves" 32, 34 on the bus then listen for the master to indicate either a read or a write transaction. For write transactions, the master first sends a device address indicating a write and the device that matches this address responds with an acknowledgement (ACK). At this point, the master can transmit an internal register address (sub-address for the device) and the actual data. The transaction terminates with the master sending a stop bit. A similar behavior occurs for a read transaction, except here data transfers from a slave to the master. Since I²C shares a common bus, there is the potential for several different covert channels, in addition to the bus-contention channel. To explore these different channels, methods of the invention were considered with respect to three configurations of the I²C bus to discover the potential ways in which information can be communicated covertly. The flows in each of these covert communications can be classified as either a functional or timing flow according to the invention.

Case 1: global bus: A global bus scenario, wherein multiple devices contend for a single bus, is the most general and commonly found bus configuration. Consider the example in which two devices wish to communicate covertly on the I²C bus as shown in FIGS. 5A-5C. At first glance, there exists an obvious information flow in this architecture since the devices themselves can "snoop" the bus. For example, a device $S_1$ can send an acknowledgement to the master to covertly transmit a 1 to another device $S_2$; conversely, it can send a negative-acknowledgement to send a 0. Since $S_2$ observes all activity on the bus, it can simply monitor which type of message $S_1$ sends and thus determine the communicated bit. While this is not the only type of flow, it is used for simplicity.

To put the present model to use on this scenario, the system shown in FIGS. 5A-5C was designed in Verilog by constructing I²C Master and Slave controllers. The slave and master RTL descriptions were synthesized down to logic gates using Synopsys' Design Compiler. For each gate primitive in the system, appropriate GLIFT logic was added. The result is a system which contains a master and two slaves, each of which also has tracking logic associated with it. A test scenario was executed having the master perform a write transaction with $S_1$ and $S_1$ send an acknowledgement by simulating it in ModelSim 10.0a, a Verilog simulator. The GLIFT logic indicates a flow to $S_2$. At this stage, the method identified that some type of information flow exists, but it is not clear if this was a functional or timing flow.

Since the devices can directly observe all interactions on the bus, one might expect this to be a functional flow. The method of the invention was used to show exactly that. The output was abstracted to y=⟨SCL,SDA⟩ of the present model since these are the only two signals observable by $S_2$ (recall that SCL is the clock line and SDA the data line). In addition, the input traces were abstracted by the present system as $A_1(X,k):=\langle S\_1\ sendingNACK\rangle$ and $A_2(X,k):=\langle S\_1\ sendingACK\rangle$; running these through the system produced two output traces $A_{G_1}$ and $A_{G_2}$. $A_{G_1}$ was collected by logging the discrete events that occurred when $S_1$ failed to acknowledge a write transaction from the master (thus intending to covertly transmit a 0). A related trace $A_{G_2}$, in which $S_1$ does acknowledge the write, was obtained. By analyzing these traces, the method identified events $e_i \in d(A_{G_1})$ and $e_j \in d(A_{G_2})$ (recall that $d(A_{G_1})$ and $d(A_{G_2})$ are the distinct traces of $A_{G_1}$ and $A_{G_2}$ respectively, as defined in Definition 4) such that val($e_j$)≠val($e_{j'}$). As a result, from Definition 14 of a functional flow, a functional flow must exist. Recall, however, that this does not mean that there exists only a functional flow. Since GLIFT indicates that there exists a flow, it may be the case that information flows from $S_1$ to $S_2$ through both functional and timing channels.

The next case discusses how such a functional flow can be easily prevented using time-multiplexing of the bus in a manner having some similarities to probabilistic partitioning [J. W. Gray III, "On introducing noise into the bus-contention channel," in *Proceedings of the 1993 IEEE Symposium on Security and Privacy*, pp. 90-98, 1993.].

Figure 6:
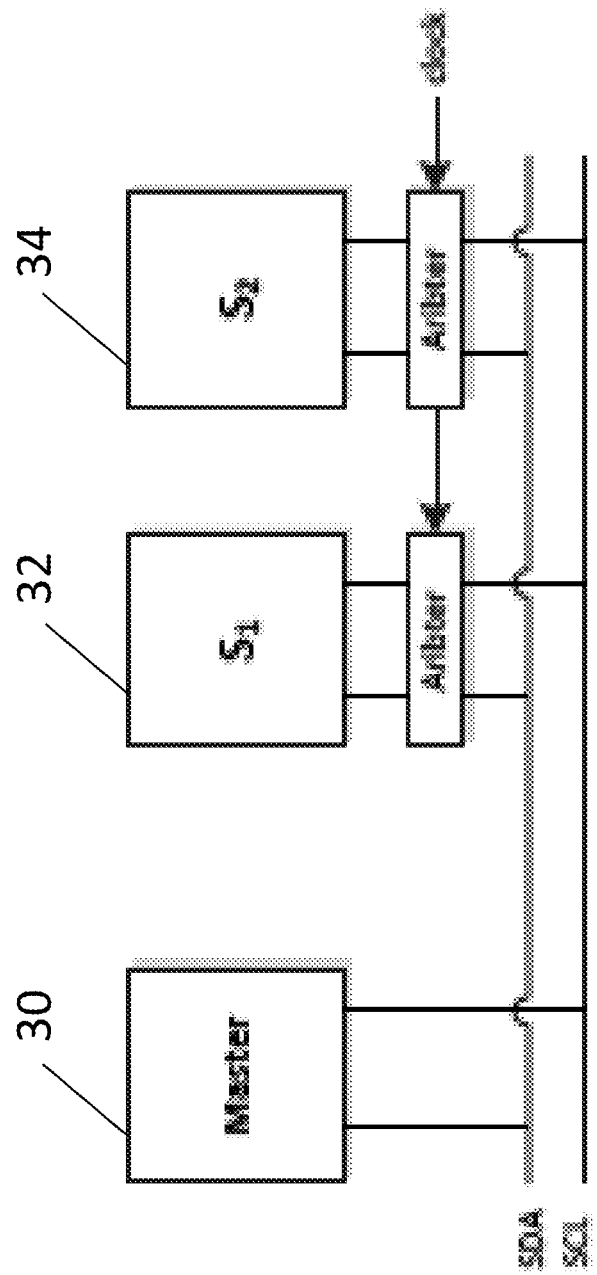
FIG. 6 shows adding strict time-partitioning of the I²C bus via an arbiter, such that the bus is only accessed by $S_1$ and $S_2$ in mutually-exclusive time slots.

A seemingly easy solution to eliminate this information flow presented in Case 1 is to add strict partitioning between when devices may access the bus, as shown in FIG. 6. An arbiter 36 is added to control slave access. Here, slaves on the bus may view the bus only within their designated time slots; this prevents devices from observing the bus traffic at all times. In this method, partitions are over-conservative by allowing the bus to be multiplexed between statically set time slots. In terms of probabilistic partitioning, the case in which the system is running in secure mode is tested. Of interest is the same scenario as before: $S_1$ wishes to transmit information covertly with $S_2$; now, however, the bus-contention channel is eliminated, as partitioning has made contention impossible.

Because the bus-contention channel has been ruled out, one might think that a covert channel between $S_1$ and $S_2$ no longer exists. Nevertheless, information can still be communicated covertly through the internal state of the master; to therefore transmit a covert bit, $S_1$ need only leave the master in a particular state before its time slot expires. For example, many bus protocols have a time-out period in case a device fails to respond to a request. If $S_1$ leaves the master in such a state prior to its time-slot expiring, $S_2$ can observe this state in the following time slot and conclude, based on the response time from the master, whether a 0 or a 1 is being transmitted: if the master's response time is short, $S_2$ can conclude $S_1$ wishes to communicate a 1, and if the response time is long it can conclude a 0. Although this type of covert channel is quite subtle, the present model can prove that this information flow occurs through a timing channel.

To make use of the present model, the Verilog master, slave, and arbiter (as shown in FIG. 6) were again synthesized into gates and the design annotated with GLIFT logic exactly as in Case 1. The same scenario as Case 1 was executed by having the master request a write to $S_1$ during $S_1$'s allocated time slot and having $S_1$ either acknowledge or not to covertly transmit a 1 or 0 respectively. After tainting the data out of $S_1$, the GLIFT logic indicated that there is indeed information flowing from $S_1$ to $S_2$. As $S_2$ can access the bus only after $S_1$'s time slot has expired, this flow must occur through the state of the master.

To prove that this is not a functional flow, abstract this system in the same manner as Case 1, except we now use $y=\langle SDA_{S_2}, SCL_{S_2}\rangle$, where $SDA_{S_2}$ and $SCL_{S_2}$ are the wires observable by $S_2$. In the same manner as Case 1, set input traces $A_1(X,k):=\langle S\_1\ sendingNACK\rangle$ and $A_2(X,k):=\langle S\_1\ sendingACK\rangle$ to collect output traces $A_{TDMA_1}$ and $A_{TDMA_2}$ respectively. Following the present model, it was applied to find the existence of an event $e_j \in d(A_{TDMA_1})$ and $e_{j'} \in d(A_{TDMA_2})$ such that $val(e_j) \neq val(e_{j'})$; it found, however, that no such events existed for this particular testing scenario. As discussed above, this provides evidence for the absence of a functional flow; although it does not completely rule out the existence of such a flow, because we have chosen the input traces to represent essentially opposite events (sending a negative-acknowledgement and sending an acknowledgement), if a functional flow did exist then it is very likely it would be captured by these two traces. The present method determines, therefore, that because GLIFT did indicate the existence of some information flow and strong evidence was provided that a functional flow does not exist, this flow is from a timing-channel.

The work of Oberg et al. [J. Oberg, et al., "Information flow isolation in I2C and USB," in Proceedings of Design Automation Conference (DAC) 2011, pp. 254-259, 2011] using GLIFT for the I²C channel indicated that all information flows are eliminated when the master device is reset back to a known state on the expiration of a slave's timeslot. In particular, this implies that no timing channels can exist, and thus the attack from Case 2 no longer applies. In practice, this trusted reset would need to come from a trusted entity such as a secure microkernel; the present method will therefore assume for the testing purposes that this reset comes from a reliable source once this subsystem is integrated into a larger system. With this assumption, this scenario was validated by adapting the test setup in Case 2 to incorporate the master being restored to an initial known state once $S_1$'s time slot expires.

The slave, master, and arbiter Verilog modules were again synthesized into logic gates, and the GLIFT tracking logic was applied. Running this test scenario, GLIFT shows that there is no information flowing from $S_1$ to $S_2$. At this point, one could conclude that no information flow exists (either functional or timing), but for the sake of completeness the present model is used to test the existence of a functional flow for this test case.

In the same manner as Case 2, abstract the output $y=\langle SDA_{S_2}, SCL_{S_2}\rangle$. Create input traces $A_1(X,k):=\langle S\_1\ sendingNACK\rangle$ and $A_2(X,k):=\langle S\_1\ sendingACK\rangle$ to log output traces $A_{TDMA_1}$ and $A_{TDMA_2}$ respectively. As expected, $d(A_{TDMA_1})=d(A_{TDMA_2})$, which is strong evidence that a functional flow does not exist.

As is demonstrated by these three cases, identifying the presented covert channels is not necessarily intuitive; furthermore, hardware designers are likely to easily overlook these problems when building their bus architectures or designing secure protocols. By combining the tracking logic of GLIFT with the present model, the invention provides a method for hardware engineers to systematically evaluate their designs to determine whether or not techniques such as those used in Case 3 can in fact eliminate covert channels such as the ones presented in Case 1 and Case 2.

Overheads

To provide an understanding of the associated overheads with these techniques, simulation times needed to execute them are provided. Simulation times were collected by using ModelSim 10.0a and its built-in time function. The simulations were run on a machine running Windows 7 64-bit Professional with an Intel Core2 Quad CPU (Q9400) @ 2.66 GHz and 4.0 GB memory.

As seen in Table 1, there is not a significant difference between simulating the designs with GLIFT logic and the base register-transfer level (RTL) designs. This is likely due to the small size of the designs and the relatively short input traces required for these particular tests. The overheads associated with GLIFT become more apparent below when identifying timing channels associated with a CPU cache.

Although two input traces are considered for each case, Table 1 presents the present simulation times for only a single input trace. As mentioned, designers may wish to check even beyond two traces to gain more assurance that a functional flow does not exist. Since the simulation time of a particular input trace is independent of the others, the results for a single trace can be scaled to consider more traces.

Cache Timing Channel

At a high-level, an access-driven cache timing attack first flushes the cache using some malicious process. Next, a secret process uses a secret key to perform encryption. Finally, the malicious process tries to determine which of the cache lines were brought into the cache in the encryption process. Since the key is XORed with part of the plaintext before indexing into a look-up table, the malicious process can correlate fast accesses with the value of the secret key. As noted by Gullasch et al. [D. Gullasch, et al., "Cache games—bringing access-based cache attacks on AES to practice," in *Proceedings of the 2011 IEEE Symposium on Security and Privacy*, pp. 490-505, 2011.], this attack assumes that the secret and malicious process share physical memory. An attack in which the secret and malicious process do not share physical memory would require slightly different behavior from the malicious process.

TABLE 1

Simulation times in milliseconds associated with the three presented cases for I² C, and for a single trace. GLIFT imposes a small overhead in the simulation time for these test cases.

|  | Case 1 | Case 2 | Case 3 |
| --- | --- | --- | --- |
| GLIFT | 223.95 ms | 230.29 ms | 222.40 ms |
| RTL | 210.45 ms | 211.72 ms | 219.04 ms |

Figure 7A:
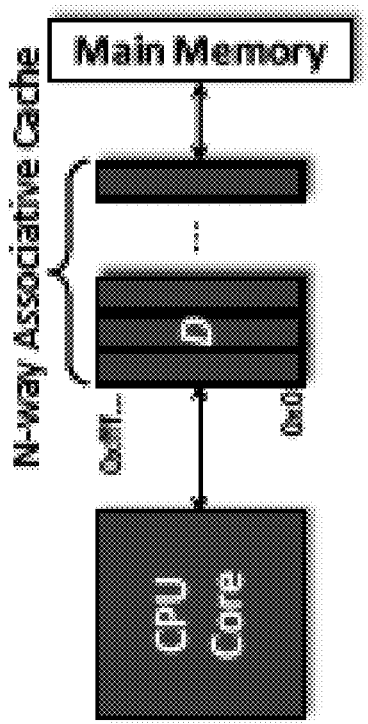
FIGS. 7A-7C illustrate a typical CPU caches and operations along with the vulnerabilities to malicious processes.
Figure 7C:
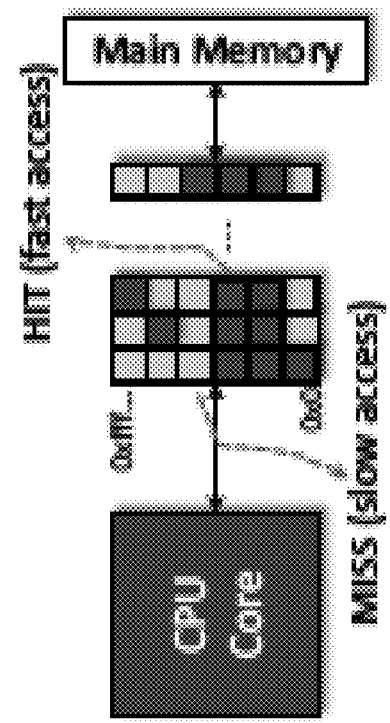
Figure 7B:
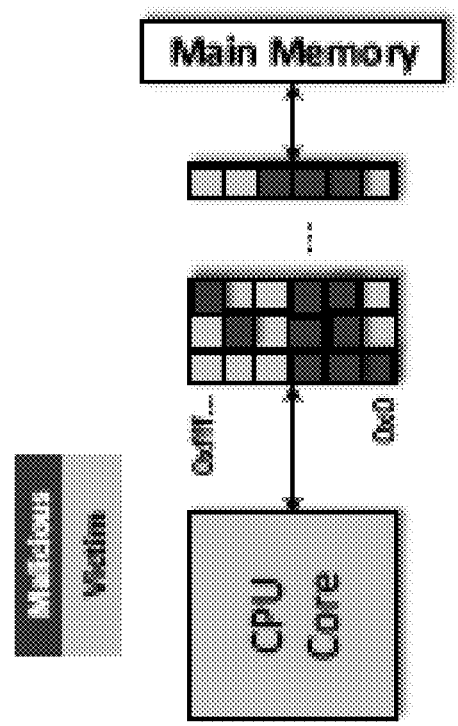

FIGS. 7A-7C are a depiction of this attack. Assume a malicious process M and secret process V (for victim). First, as seen in FIG. 7A, M flushes all contents of the cache. Next, as seen in FIG. 7B, V subsequently runs AES using a secret key as input for a short duration; this process fills the contents of the cache. Now, in FIG. 7C, M reads memory locations and observes the latency of each access. Since M and V share physical memory, M will receive memory responses with lower latency if V accessed this data prior to the context switch, as it will already reside in the cache. Because the secret key used by V is an index into look-up tables, the access latencies of M (i.e., a cache hit or miss) directly correlate with the value of the secret key.

Identifying the Cache Attack as a Timing Channel

As the above attack critically requires on the timing information available to M, it can clearly be identified as a type of timing attack. to the invention can test and prove that any information flows are timing-based.

A complete MIPS based processor written in Verilog was developed to test this scenario. The processor is capable of running several of the SPEC 2006 [J. L. Henning, "Spec cpu2006 benchmark descriptions," *SIGARCH Comput.*

*Archit. News*, pp. 1-17, 2006] benchmarks including mcf, specrand, and bzip2, in addition to two security benchmarks: sha and aes, all of which are executed on the processor being simulated in ModelSim SE 10.0a (a commercial HDL simulator). All benchmarks are cross-compiled to the MIPS assembly using gcc and loaded into instruction memory using a Verilog testbench. The architecture of the processor consists of a 5-stage pipeline and 16K-entry direct mapped cache (1-way cache). A direct-mapped cache is used for the experiments for ease of testing, but note that this analysis would apply directly to a cache with greater associativity.

Figure 8:
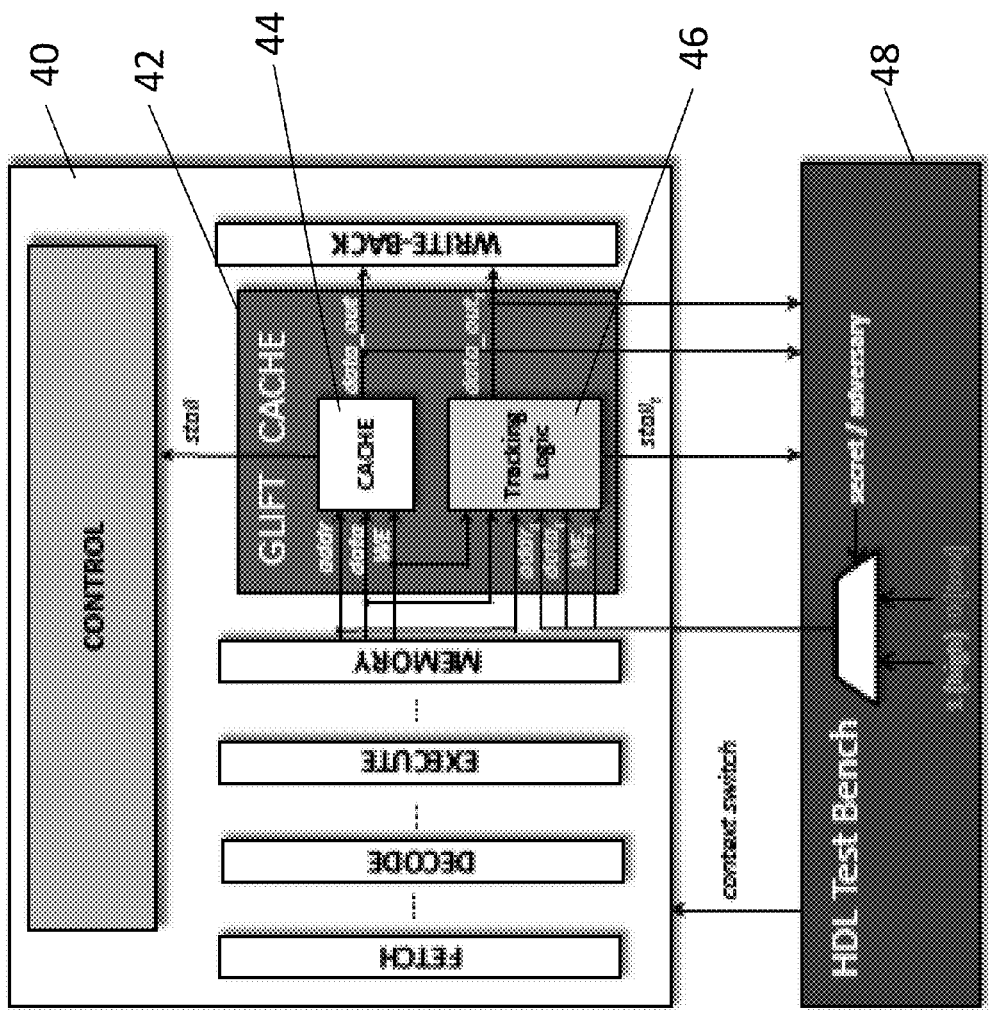
FIG. 8 is a block diagram of a simple MIPS-based CPU in which the cache is replaced by one which contains the original cache and its associated tracking logic to conduct an analysis of the invention in which a testbench drives the simulation of the processor to capture the output traces.

FIG. 8 is a block diagram of a simple MIPS-based CPU 40 in which the cache is replaced by a GLIFT cache 42 which contains the original cache 44 and its associated tracking logic 46 to conduct an analysis of the invention in which a testbench 48 drives the simulation of the processor to capture the output traces. GLIFT logic is applied directly to the cache system. Hardware modules associated with the cache (cache control logic and the memory itself) are removed and synthesized to logic gates and flip-flops using Synopsys' Design Compiler using their and_or.db library; this library contains basic 2-input ANDs, ORs, inverters and flip-flops, and thus the resulting design contains only these primitives. Each gate and flip-flop in the design is then process and its associated tracking logic is added in a compositional manner. Each gate and flip-flop is processed linearly and the GLIFT logic associated with their function (AND, OR, etc.) is added. This new "GLIFTed" cache is re-inserted into the register-transfer level (RTL) processor design in the place of the original RTL cache. This is shown in FIG. 8. The input and output to the cache system include address and data lines and control signals (write-enable, memory stall signals, etc.); each such input and output is now associated with a taint bit which will be essential to testing whether or not information flows from the victim process V to the malicious process M.

To execute the test scenario, the same procedure is followed as in the access-driven timing attack previously discussed by having malicious and victim executions share the cache. Have M first flush the cache by resetting all data in the cache. Then have V execute AES with all inputs to the cache marked as tainted (i.e. secret). Subsequently, have M execute and observe whether or not information from V flows to M. As expected, it is observed that as M reads from memory locations, secret information immediately flows out of the cache. The method therefore knows that a flow exists, but at this stage it is still ambiguous whether the flow is functional or timing.

To identify exactly which type of channel was identified by GLIFT, leverage the benefits of the present model by working to identify a functional flow; as previously discussed, if no functional flow is detected, then the flow must be from a timing channel. To fit the present model, abstract the output of the cache as $y=\langle data_M \rangle$ to indicate the cache output observable by M (note that, in particular, stall is not included in this output, as it cannot be observed directly by M). Following the present model, two traces are: $A_1(X,k):=\langle V \text{ using } K\_1 \rangle$ and $A_2(X,k):=\langle V \text{ using } K\_2 \rangle$; i.e., the cases in which V encrypts using two different keys. These were simulated and all of the discrete events captured by ModelSim were logged to obtain to output traces $A_{C1}$ and $A_2$; by definition of y, these output traces contain all events observable by M. After collecting these traces, the method then checked whether or not a functional flow exists for these particular traces by looking for the existence of events $e_j \in d(A_{C1})$ and $e_{j'} \in d(A_{C2})$ such that val $(e_j) \neq val(e_{j'})$. For these particular traces, no such pair of events were found. Again, although the fact that no functional flow exists with respect to these particular traces does not imply the lack of a functional flow for any traces, it does lend evidence to the theory that the flow must be timing-based rather than functional (and additional testing with different keys would provide further support).

Overheads

As for $I^2C$, the overheads associated with the present technique were estimated by measuring simulation time. The measurements were collected using ModelSim 10.0a and its built in time function running on the same Windows 7 64-bit Professional machine with an Intel Core2 Quad CPU (Q9400) @ 2.66 GHz and 4.0 GB of memory. The time for the secret process (V) to run AES on a secret key $K_1$ was measured followed by a malicious process (M) attempting to observe which cache lines were evicted. This measurement was repeated for both the design with and without GLIFT. For completeness, the same process was repeated for the second input traces; namely when V executes AES using $K_2$ followed by M attempting to observe which cache lines were evicted. The resulting times from these simulations can be found in Table 2.

As Table 2 shows, there is a substantial overhead (≈6×) for using GLIFT to detect whether or not a flow exists. Furthermore, since the behavior of M is fixed between both input traces and the only value changing is the secret key, the results clearly show that a timing channel exists with regards to the cache, as the execution time for AES on $K_2$ is longer than that of $K_1$; the existence of such a timing channel was also identified by GLIFT and the present model With more and more embedded systems governing the most critical aspects of our lives, the need to provide strong information flow guarantees becomes essential. Using existing techniques, we can do quite well at identifying these information flows, even those through timing channels. The simiulations show that where prior techniques fail, timing and functional flows can be efficiently distinguished, allowing designers to make informed decisions about whether or not to be concerned with information flows identified by hardware information flow tracking techniques. In many cases, the designer is likely to be more concerned by timing channels than by functional flows, while in other cases the existence of timing channels might cause little concern.

The simulations and testing showed the usefulness of the present invention applied to a shared bus and cache, and artisans will appreciate the broader applicability. The examples showed how information flows can indeed be identified as timing-based with a modified approach that applies gate level information flow tracking. While in some cases the present method does not provide any definite guarantees, it does provide strong evidence to rule out the existence of functional flows. The present framework can therefore provide strong evidence for the existence of timing channels.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for detecting a timing channel in a hardware design, the method comprising:
receiving a hardware design;
synthesizing at least one portion of the hardware design with gate level primitives;

adding tracking logic to the gate level primitives to monitor information flow through the gate level primitives;

simulating sets of inputs to the gate level primitives including added taint inputs to identify information flows by generating outputs from the gate level primitives for every clock tick while changing only taint inputs;

isolating timing flows from information flows by conducting input-to-output deterministic traces to isolate functional flows in the information flows.

2. The method of claim 1, wherein said separating comprises selecting a subset of input deterministic traces for the tracking logic.

3. The method of claim 2, wherein the subset is selected by changing the value of only the security critical inputs randomly or by a designers choice.

4. The method of claim 1, wherein said simulating comprises finding a subset of taint inputs that cause a change in the timing of outputs without changing output values.

5. The method of claim 4, wherein said finding begins with selecting input traces which differ in values of security critical inputs.

6. The method of claim 4, wherein said finding begins with a random selection of input traces.

7. The method of claim 4, wherein said finding begins with selecting input traces aided by information provided by a hardware designer.

8. The method of claim 1, wherein said hardware design comprises a design in a hardware description language, said synthesizing the design into a gate level netlist, and the tracking logic is added to every gate level primitive in the netlist.

9. A method for detecting a timing channel in a hardware design, the method comprising:

synthesizing the hardware design to gate level;

applying gate level information flow tracing to the gate level of the hardware design via a simulation to search for tainted flows;

wherein the simulation includes simulating sets of inputs to gate level primitives including added taint inputs to identify tainted flows by generating outputs from the gate level primitives for every clock tick while changing only taint inputs; and if a tainted flow is found, selecting a limited number of traces, simulating an input on the limited number of traces, determining whether the traces are value preserving with respect to taint inputs, and determining that a timing flow exists if the traces are value preserving with respect to the taint inputs.

* * * * *